UNITED STATES PATENT OFFICE.

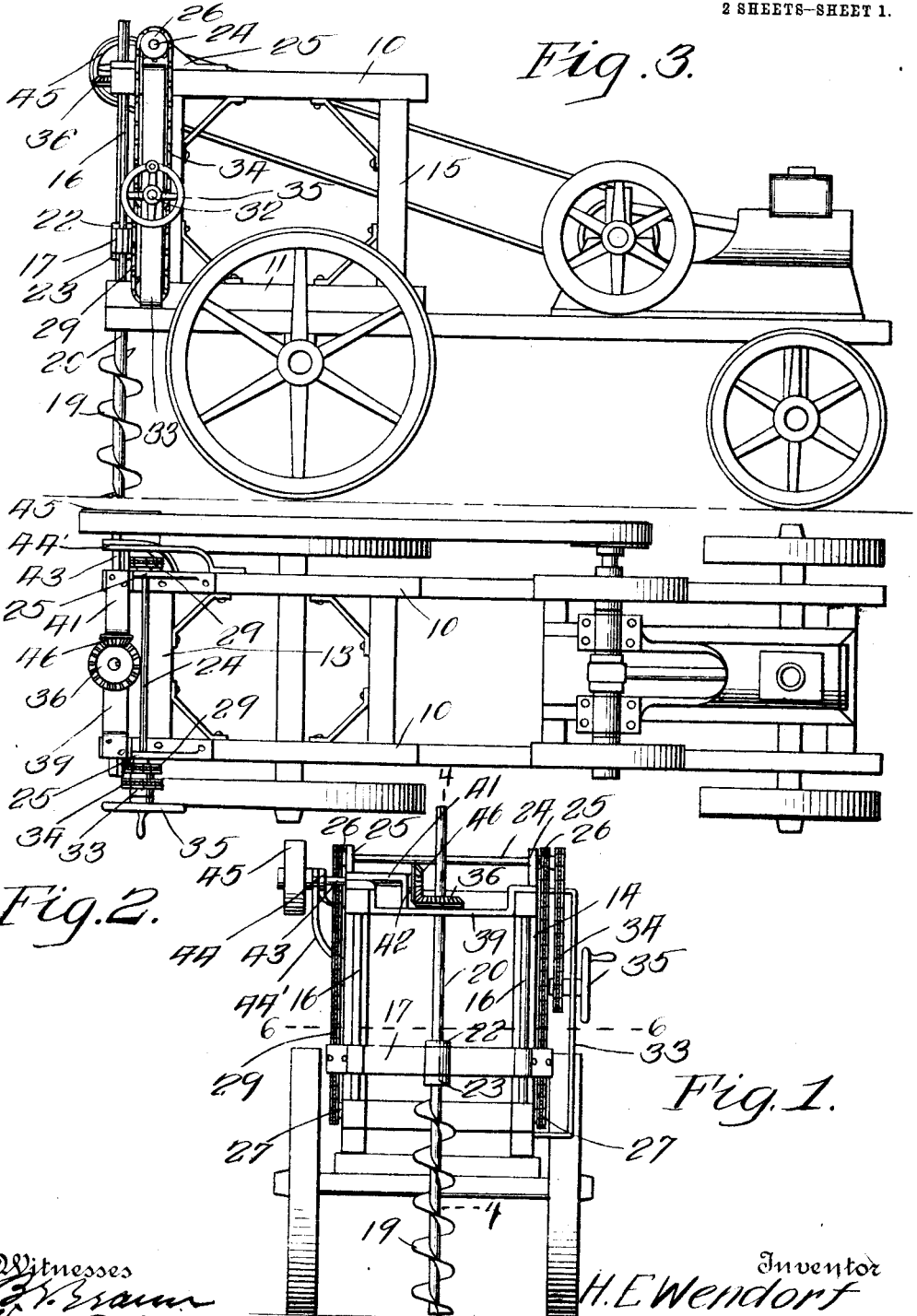

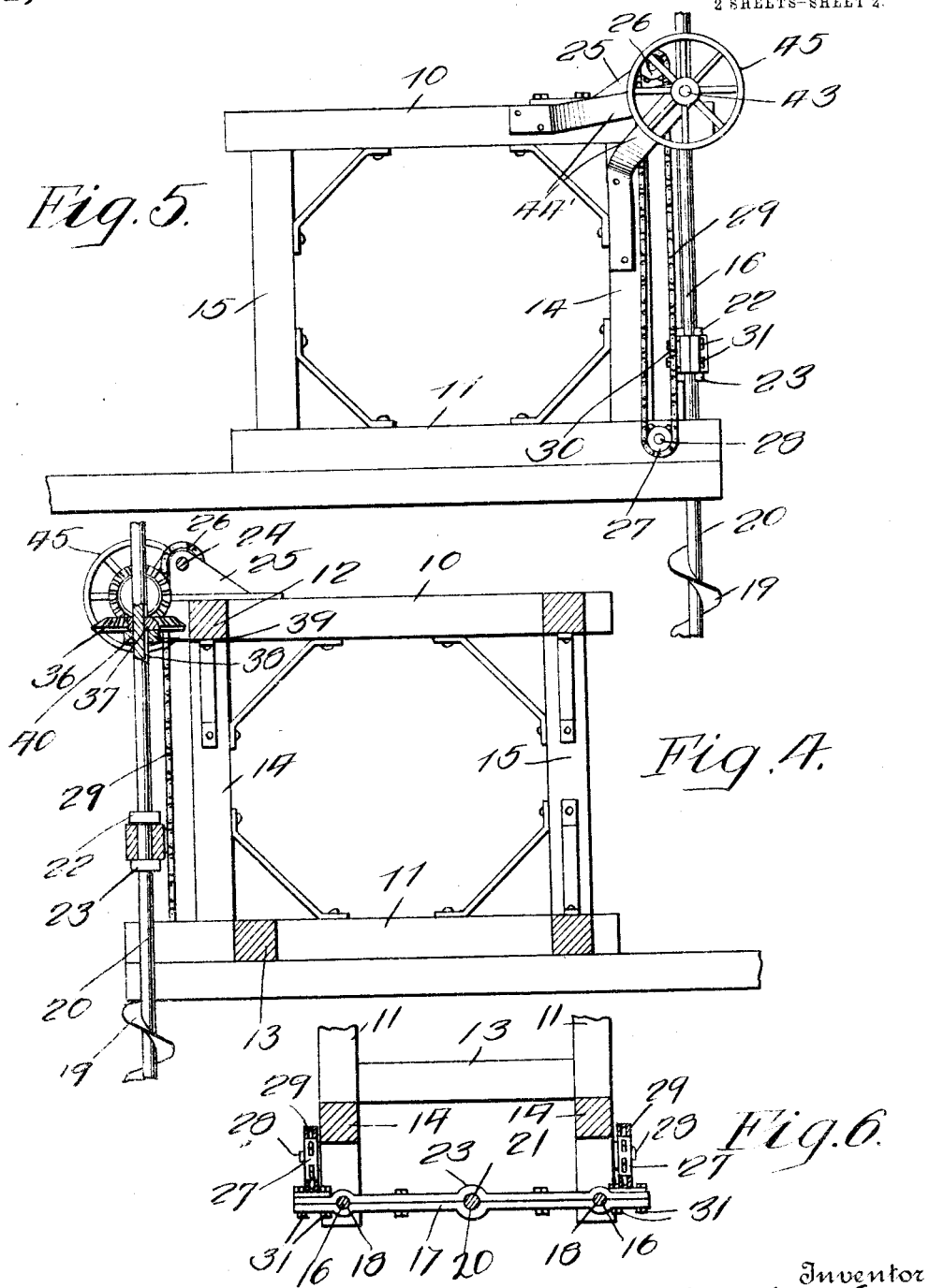

HERMAN E. WENDORF, OF LAKEMILLS, WISCONSIN.

POST-HOLE DIGGER.

1,107,734.　　　　　Specification of Letters Patent.　　Patented Aug. 18, 1914.

Application filed May 2, 1913. Serial No. 765,149.

*To all whom it may concern:*

Be it known that I, HERMAN E. WENDORF, a citizen of the United States, residing at Lakemills, in the county of Jefferson, State of Wisconsin, have invented certain new and useful Improvements in Post-Hole Diggers; and I do hereby declare the following to be a full, clear, and exact description of the invention, such as will enable others skilled in the art to which it appertains to make and use the same.

This invention relates to post hole diggers and has for an object to provide a novel means for raising and lowering the auger.

A further object is the provision of a post hole digger which can be constructed of a few simple and durable parts which will not easily get out of order.

With the above objects in view the invention consists of certain novel details of construction and combination of parts hereinafter fully described and claimed, it being understood that various modifications may be made in the minor details of construction within the scope of the appended claims.

In the accompanying drawing illustrating this invention:—Figure 1 is a front elevation. Fig. 2 is a plan. Fig. 3 is a side elevation of the auger feed side of the device. Fig. 4 is a vertical section on 4—4 Fig. 1. Fig. 5 is a side elevation showing the opposite side of the device from that shown in Fig. 3. Fig. 6 is a horizontal sectional view on 6—6 Fig. 1.

Referring now to the drawing in which like characters of reference designate similar parts, the main frame of the device is shown to comprise upper and lower longitudinal sills 10 and 11, connected near the ends by upper and lower cross sills 12 and 13, and connected near the ends by front and rear vertical uprights 14 and 15.

A pair of guide rods 16 are fixed at the upper ends to the upper longitudinal sills 10 and at the lower ends to the lower longitudinal sills 11 in advance of the front vertical uprights 14. A slide bar 17 is provided near the ends with openings 18 which loosely receive the guide rods 16. An auger 19 has the stem 20 turnably mounted in a vertical opening 21 formed centrally in the slide bar, there being collars 22 and 23 on the stem above and below the slide bar to prevent vertical movement of the stem through the bar. Upon raising and lowering of the slide bar on the guide rod, the auger will be raised and lowered.

For actuating the slide bar, a transverse shaft 24 is journaled near the ends in brackets 25 carried on top of the upper longitudinal sills 10 and is equipped at the ends with sprocket gears 26. Idle sprocket gears 27 are mounted on stub shafts 28 secured to the lower longitudinal sills 11 in vertical alinement with the sprocket gears 26. Over each sprocket gear 26 and corresponding sprocket gear 27 is trained a sprocket chain 29, the ends 30 of which are connected to the ends of a bolt 31 passed transversely through the adjacent end of the slide bar 17. Upon actuation of the shaft 24 the sprocket chains on both sides of the machine will be simultaneously fed over their related sprocket gears with a resultant raising or lowering of the slide bar horizontally, according to the direction of rotation of the shaft.

For actuating the shaft 24, a stub shaft 32 is journaled in a bracket 33 carried on the outer side of one of the vertical uprights 14, and is also journaled in said upright, this shaft being operatively connected to the shaft 24 by means of a chain drive 34, and being actuated by a hand wheel 35 connected to the end of the shaft outside of the bracket.

For rotating the auger, a bevel gear 36 is slidably fitted on the auger stem by means of a projection 37 on the gear fitting in a longitudinal groove 38 in the stem, the gear normally bearing upon a cross arm 39 which has a central opening 40 to receive the stem and is terminally secured to the upper longitudinal sills 10. A bracket 41 is secured to one of the upper longitudinal sills and terminates in a down-turned ear 42. A shaft 43 is journaled on the bracket 41 and projects through an opening in the ear 42, this shaft being equipped on the outer end with a driving pulley 45, and being equipped on the inner end with a bevel pinion 46 which meshes with and drives the bevel gear 36, thereby rotating the auger. The shaft 43 is further journally supported by eyes 44 which are formed at the free ends of angular brackets 44' extending from the adjacent portions of the top sill 10 and vertical upright 15. The bevel pinion bears down upon the bevel gear and holds the latter down upon the cross arm 39 so that the auger may be raised and lowered through the bevel gear, while being rotated.

From the above description it will be seen that I have provided an extremely simple and durable post hole digger which is formed of a few parts that will not easily get out of order.

What is claimed, is:—

1. In a post hole digger, the combination with a frame, of a pair of parallel guide rods thereon, a slide bar secured to and movable between said guide rods, feed chains on opposite sides of said frame connected to the ends of said bar and operating to actuate said bar, and an auger revolubly fitted in said bar between and parallel with said guide rods.

2. In a post hole digger, the combination with a frame, of a pair of parallel guide rods, a transverse slide bar terminally connected to and movable longitudinally between said guide rods, an auger revolubly secured to said slide bar, a transverse shaft on said frame, sprockets on said shaft near the ends thereof, other sprockets on said frame in alinement with said shaft sprockets, sprocket chains trained over corresponding sprockets and connected to adjacent ends of said slide bar, means for rotating said auger, and means for rotating said shaft whereby to actuate said slide bar and raise or lower said auger.

In testimony whereof, I affix my signature, in the presence of two witnesses.

HERMAN E. WENDORF.

Witnesses:
E. C. BROWN,
J. A. REED.